United States Patent
Kuo

(10) Patent No.: US 8,066,238 B1
(45) Date of Patent: Nov. 29, 2011

(54) SUCTION CUP

(75) Inventor: Da-yong Kuo, Tu Cheng (TW)

(73) Assignee: Cheng Uei Precision Industry Co., Ltd., Tu Cheng, Taipei (TW)

( * ) Notice: Subject to any disclaimer, the term of this patent is extended or adjusted under 35 U.S.C. 154(b) by 0 days.

(21) Appl. No.: 12/884,081

(22) Filed: Sep. 16, 2010

(51) Int. Cl.
*A45D 42/14* (2006.01)
(52) U.S. Cl. .................. 248/205.7; 248/363; 248/362
(58) Field of Classification Search .......... 248/205.6, 248/205.7, 205.8, 205.9, 206.1, 206.2, 206.4, 248/363, 362, 205.5, 309.3, 467, 537
See application file for complete search history.

(56) References Cited

U.S. PATENT DOCUMENTS

| | | | | |
|---|---|---|---|---|
| 1,117,548 A * | 11/1914 | Bouchery | | 248/362 |
| 1,840,400 A * | 1/1932 | Lebherz | | 248/362 |
| 2,871,053 A * | 1/1959 | Richter | | 294/64.1 |
| 3,610,304 A * | 10/1971 | Popeil et al. | | 241/92 |
| 3,675,886 A * | 7/1972 | Kampmier | | 248/363 |
| 3,765,638 A * | 10/1973 | Harrison | | 248/363 |
| 4,180,229 A * | 12/1979 | Schulein | | 248/363 |
| 4,934,641 A * | 6/1990 | McElhaney | | 248/206.2 |
| 5,029,786 A * | 7/1991 | Wu | | 248/205.7 |
| 5,031,865 A * | 7/1991 | Blattner | | 248/177.1 |
| 5,366,129 A * | 11/1994 | Nakamura et al. | | 225/42 |
| 5,970,860 A * | 10/1999 | Yip | | 99/510 |
| 6,386,494 B1 * | 5/2002 | Huang | | 248/205.8 |
| 7,021,593 B1 * | 4/2006 | Fan | | 248/206.2 |
| 7,431,250 B2 * | 10/2008 | Chen | | 248/205.5 |
| 7,469,868 B2 * | 12/2008 | Bury | | 248/205.8 |
| 2006/0086872 A1 * | 4/2006 | Fan | | 248/205.8 |
| 2008/0023602 A1 * | 1/2008 | Bury | | 248/205.8 |

\* cited by examiner

*Primary Examiner* — Kimberly Wood
(74) *Attorney, Agent, or Firm* — Cheng-Ju Chiang

(57) ABSTRACT

Provided is a suction cup including a cover, a shell, a suction mouth and an operating mechanism. The cover forms an opening. The shell is fixedly mounted on the cover. The suction mouth is fixedly mounted below the cover. The operating mechanism is pivotally mounted to the shell and includes a pivot body. The pivot body disposes a hand lever. An axle sleeve is fixedly mounted to the pivot body and disposes a pulling portion. The axle sleeve passes through a through hole of the suction mouth, and the pulling portion is against an upper inner surface of the through hole. By rotating the hand lever, the operating mechanism can upwardly pull the handle to raise the center of the suction mouth for rarefying air and making the suction cup be stably fixed on a plane. The suction cup has a simple structure and is convenient to be used.

4 Claims, 4 Drawing Sheets

SUCTION CUP

BACKGROUND OF THE INVENTION

1. Field of the Invention

The present invention relates to a suction cup, and more particularly to a suction cup having a simple structure and being convenient to be used.

2. Description of the Prior Art

A suction cup is a pneumatic element, which can form a temporary airtight cavity closed with a surface of an object contacted with the pneumatic element, and can use pressure difference generated by pumping out or rarefying air inner the temporary airtight cavity to adhere to the surface of the object. Ordinarily the suction cup is used as a mounted base for fixing some small components.

But the structure of the prior suction cup is generally more complex and the cost thereof is high. Hence, it is needed to simplify the structure of the prior suction cup.

BRIEF SUMMARY OF THE INVENTION

An object of the present invention is to provide a suction cup having a simple structure and being convenient to be used.

To achieve the above object, in accordance with the present invention, a suction cup is provided, comprising a cover, a shell, a suction mouth and an operating mechanism. The cover forms an opening. The shell is fixedly mounted on the cover. The suction mouth is made of elastic material and is fixedly mounted below the cover, wherein the suction mouth disposes a handle, which forms a through hole and can pass through the opening of the cover to be received in the shell. The operating mechanism is pivotally mounted to the shell and includes a pivot body; wherein the pivot body disposes a hand lever, an axle sleeve is fixedly mounted to the pivot body and disposes a pulling portion on one side thereof, the axle sleeve passes through the through hole of the suction mouth, and the pulling portion is against an upper inner surface of the through hole.

Based on the above description, the suction cup as provided by the present invention is placed on a plane and is applied to a force for flattening it. By rotating the hand lever, the operating mechanism can upwardly pull the handle to raise the center of the suction mouth for rarefying air inner the suction mouth and making the suction cup be stably fixed on the plane. The suction cup has a simple structure and is convenient to be used.

DETAILED DESCRIPTION OF THE PREFERRED EMBODIMENTS

The following embodiment with reference to the accompanying drawings now has been given for detail describing the technology, the feature, the object and the effect of the present invention.

Figure 1:
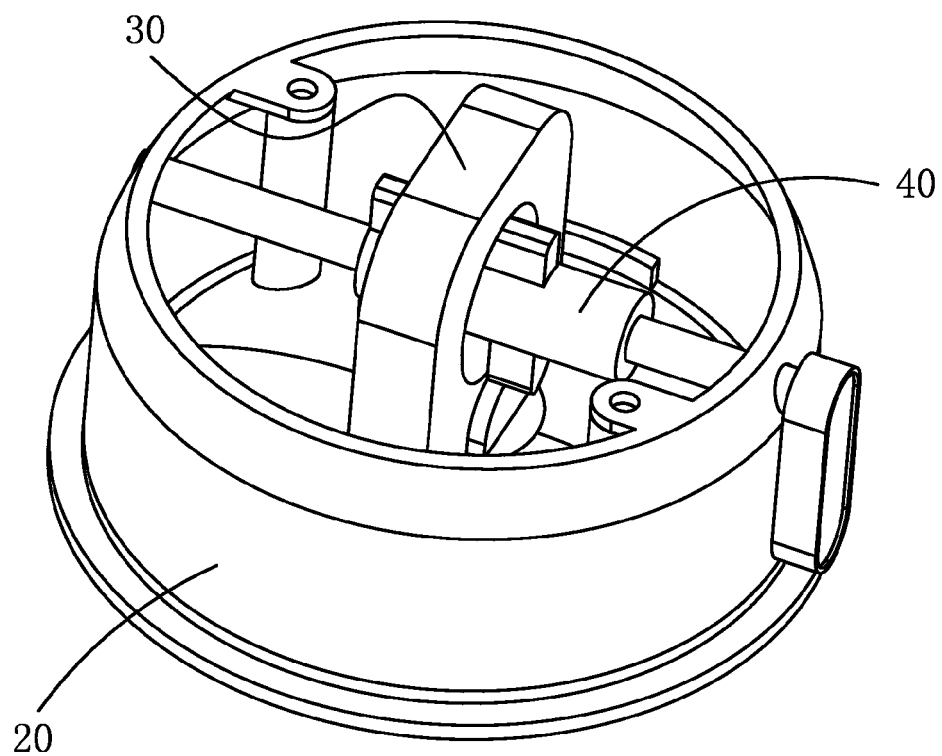
FIG. 1 is a perspective view of a suction cup according to one embodiment of the present invention.
Figure 2:
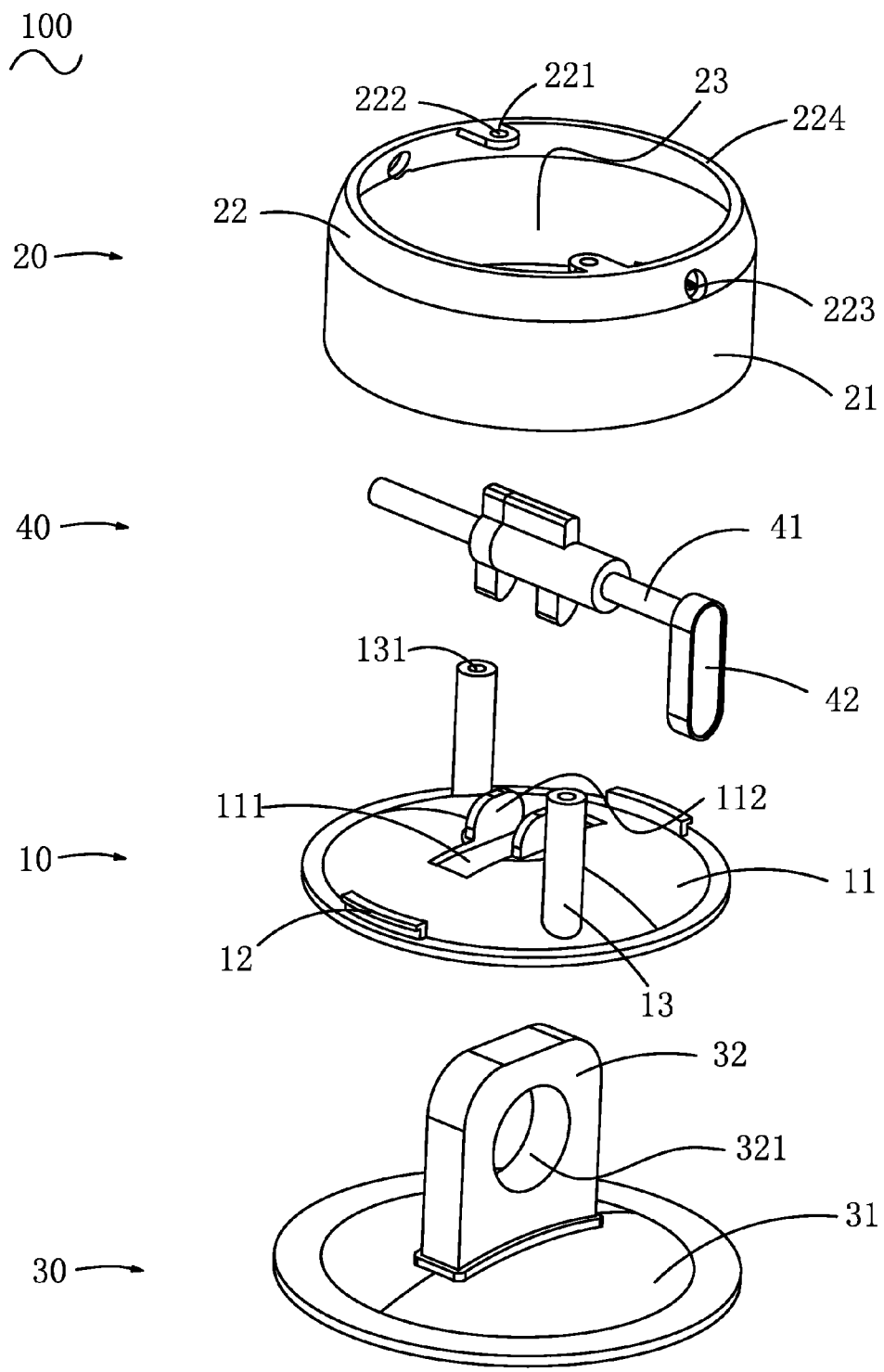
FIG. 2 is an exploded view of the suction cup of FIG. 1.

Please refer to FIGS. 1 and 2, a suction cup 100 of the present invention comprises a cover 10, a shell 20, a suction mouth 30 and an operating mechanism 40.

Referring to FIG. 2, the cover 10 has a disc-shaped base 11, a periphery of which is horizontal and a middle of which is protruding upward. A strip-shaped opening 111 is formed on the middle of the base 11. Tow plate-like protruding portions 112 are disposed on the base 11 and separately located on two sides of the opening 111. Two holding blocks 12 are disposed on the base 11, and separately protruding from two opposite sides of the periphery of the base 11, and are bent outward. Two columnar positioning posts 13 are separately disposed on the other two opposite sides of the periphery of the base 11. Each positioning post 13 disposes a locking hole 131 formed on a top surface thereof.

Figure 3:
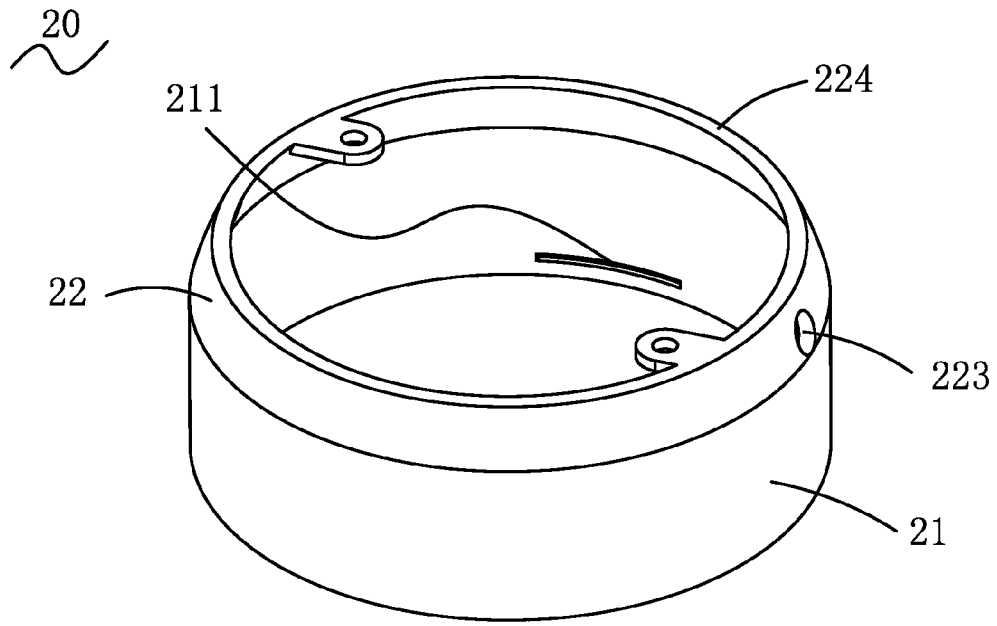
FIG. 3 is a perspective view of a shell of the suction cup of FIG. 1.

Referring to FIGS. 2 and 3, the shell 20 is fixedly mounted on the cover 10. The shell 20 includes an annular sidewall 21 and an annular top wall 22, which is extending upward from the annular sidewall 21 and inclining inward. The sidewall 21 and the top wall 22 define a receiving cavity 23. The annular sidewall 21 disposes two strip-shaped grooves 211 separately formed on two opposite sides of a lower portion of an inner surface thereof. The top wall 22 disposes two positioning plates 221, which are separately formed on two opposite sides of an upper edge 224 thereof and are horizontal extending toward the receiving cavity 23. The positioning plate 221 forms a circular positioning hole 222. The top wall 22 further disposes two circular inserting holes 223 separately formed on two opposite sides of an outer surface thereof and passing through the top wall 22.

Continuing to refer to FIG. 2, the suction mouth 30 is made of elastic material. The suction mouth 30 is fixedly mounted below the cover 10, and has a disc-shaped plastic plate 31, which disposes a handle 32 protruding from a middle portion of a top surface thereof. The handle 32 forms a circular through hole 321 on middle thereof.

Figure 4:
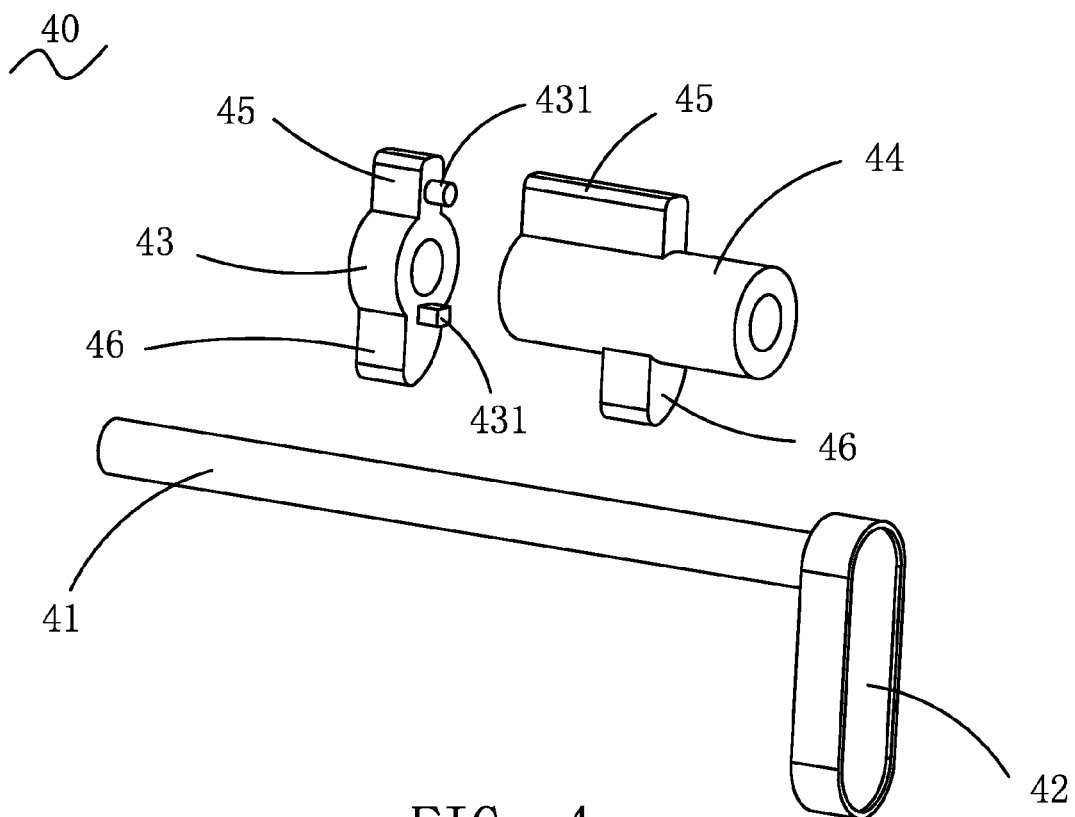
FIG. 4 is a perspective view of an operating mechanism of the suction cup of FIG. 1.
Figure 5:
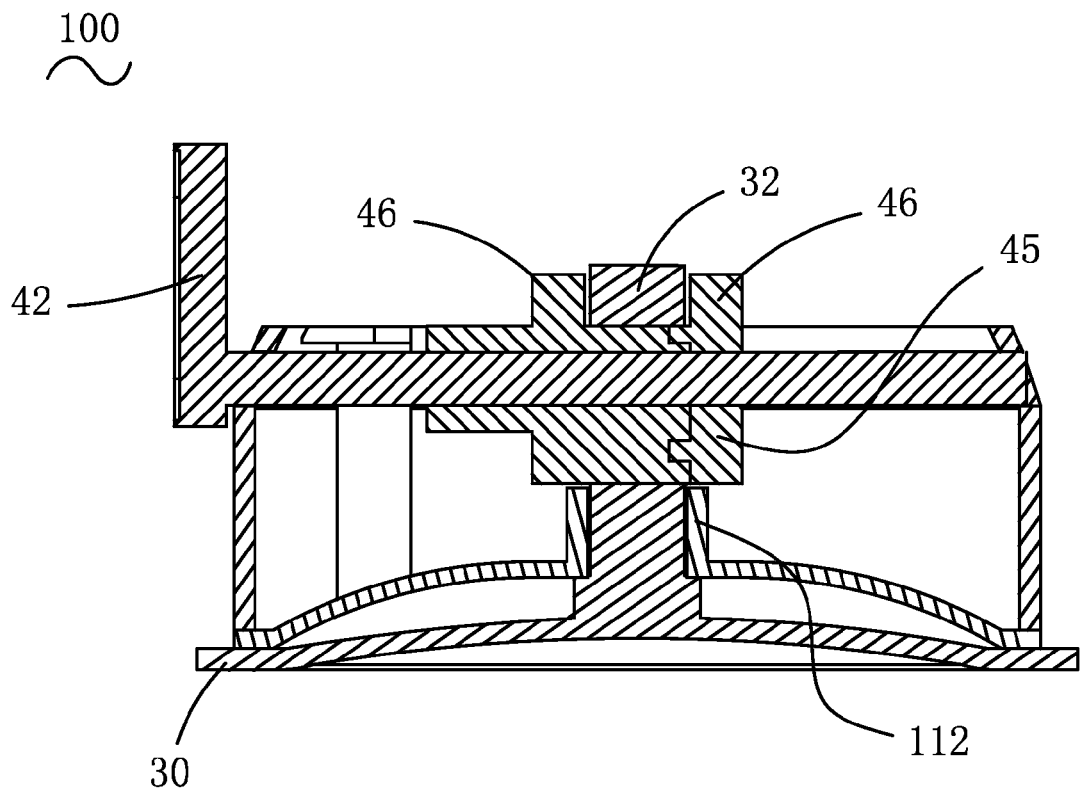
FIG. 5 is a state view of the suction cup before using.
Figure 6:
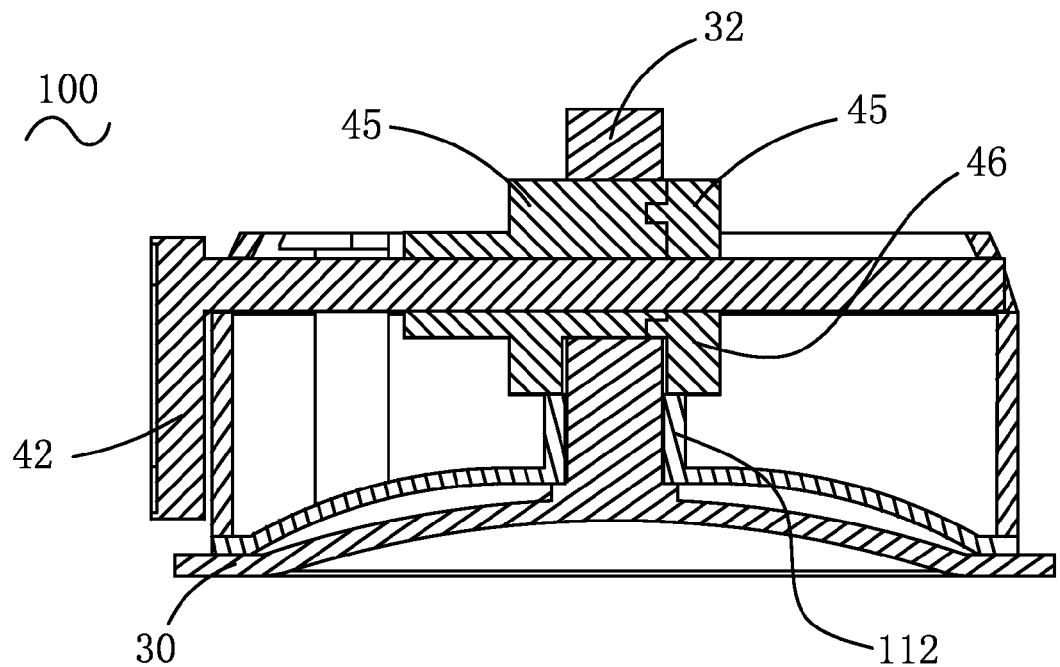
FIG. 6 is a state view of the suction cup after using.

Referring to FIGS. 2 and 4, the operating mechanism 40 is pivotally mounted on the shell 20. The operating mechanism 40 can pass through the through hole 321 of the suction mouth 30 to be fixedly mounted in the receiving cavity 23 of the shell 20. The operating mechanism 40 has a pivot body, on one end of which a hand lever 42 is disposed, and on the middle of which an axle sleeve is mounted. The axle sleeve includes a first axle sleeve 43 and a second axle sleeve 44. The first axle sleeve 43 disposes a plurality of positioning blocks 431. The second axle sleeve 44 disposes a plurality of positioning grooves (not shown in all FIGS), which are separately received into the corresponding positioning blocks 431. Whereby the first and second axle sleeves 43, 44 can be assembled together. Both the first and second axle sleeves 43, 44 dispose a pulling portion 45 and a pressing portion 46, which are separately and oppositely protruding outward from two opposite sides of each axle sleeve 43 or 44. The two pulling portions 45 of the first and second axle sleeves 43, 44 can be connected together, and the pressing portion 46 is generally a half circular-arc shape.

Referring to FIGS. 2 to 6, when assembling the suction cup 100 of the present invention, the shell 20 is mounted on the cover 10. The positioning hole 222 of the positioning plate 221 of the shell 20 is aligned with the locking hole 131 of the positioning post 13 of the cover 11, and a positioning member (not shown in all FIGS) is employed to insert into the positioning hole 222 and the locking holes 131. The holding blocks 12 of the cover 10 are separately received into the corresponding grooves 211. Whereby the shell 20 can be completely fixed on the cover 10. The handle 32 of the suction mouth 30 passes through the opening 111 of the base 11 and is received in the receiving cavity 23 of the shell 20. The protruding portions 112 located on the two sides of the opening 111 are separately contacted with two side surfaces of the handle 32. One end of the pivot body 41 of the operating mechanism 40 is inserted into the one inserting hole 223 of the shell 20, passes through the through hole 321 of the suction mouth 30, and goes out from the other inserting hole 223 of the shell 20. The first and second axle sleeves 43, 44 disposed on the pivot body 41 are tightly contacted with an upper inner surface of the through hole 321, thereby making the suction mouth 30 be fixed to the cover 10.

Before using the suction cup 100, the pulling portions 45 are separately adjacent to the corresponding protruding portions 112 of the cover 10, and the pulling portions 45 and the protruding portions 112 are spaced a distance. The two pressing portions 46 are separately located on the two side surfaces of the handle 32 of the suction mouth 30. The through hole 321 is hanged on the outer surfaces of the first and second axle sleeves 43, 44 between the two pressing portions 46. Finally, the suction mouth 30 is placed on a plane and is applied to a force for flattening it.

When using the suction cup 100, the hand lever 42 is given a clockwise rotation of 180 degree, to drive the first and second axle sleeves 43, 44 to rotate clockwise. The two pressing portions 46 separately and downwardly push the corresponding protruding portions 112 of the cover 10, and the two pulling portions 45 upwardly pull the handle 32, so that the horizontal periphery of the cover 10 and the plastic plate 31 tightly contact with each other. Now the center of the plastic plate 31 is raised upward thereby rarefying air inner the suction mouth 30 to form vacuum space between the suction mouth 30 and the plane, so that the suction cup 100 can be stably fixed on the plane.

Because the protruding portions 112 and the pressing portions 46 are configured as a half circular-arc shape, the first and second axle sleeves 43, 44 can avoid to be interfered with the protruding portions 112, thereby avoiding to be rotated with difficulty or to even be destroyed.

As described above, the suction cup 100 of the present invention can upwardly pull the handle 32 to raise the center of the suction mouth 30 by rotating the operating mechanism 40, thereby rarefying air inner the suction mouth 30 and making the suction cup 100 be stably fixed on the plane. The suction cup 100 has a simple structure and is convenient to be used.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A suction cup comprising:
   a cover, forming an opening and disposing two protruding portions separately located on two sides of the opening and being extending upward;
   a shell, being fixedly mounted on the cover;
   a suction mouth, being made of elastic material and being fixedly mounted below the cover, wherein the suction mouth disposes a handle, which forms a through hole and can pass through the opening of the cover to be received in the shell; and
   an operating mechanism, being pivotally mounted to the shell and including a pivot body; wherein the pivot body disposes a hand lever, an axle sleeve is fixedly mounted to the pivot body and disposes a pulling portion on one side thereof and a pressing portion on the other side thereof, the axle sleeve passes through the through hole of the suction mouth, the pulling portion is against an upper inner surface of the through hole, and the pressing portion is against the two protruding portions of the cover.

2. The suction cup as claimed in claim 1, wherein the axle sleeve includes a first axle sleeve and a second axle sleeve, which can be assembled together, two partial pulling portions are separately disposed on one sides of the first and second axle sleeves and can be connected together to make up the pulling portion.

3. The suction cup as claimed in claim 1, wherein the shell disposes two strip-shaped grooves separately formed on two opposite sides of an inner surface thereof; the cover disposes two holding blocks, which are separately protruding from two opposite sides of a periphery thereof and are separately bent outward; and the two holding blocks are separately received into the two strip-shaped grooves.

4. A suction cup comprising:
   a cover, forming an opening;
   a shell, being fixedly mounted on the cover;
   a suction mouth, being made of elastic material and being fixedly mounted below the cover, wherein the suction mouth disposes a handle, which forms a through hole and can pass through the opening of the cover to be received in the shell; and
   an operating mechanism, being pivotally mounted to the shell and including a pivot body; wherein the pivot body disposes a hand lever, an axle sleeve is fixedly mounted to the pivot body and disposes a pulling portion on one side thereof, the axle sleeve passes through the through hole of the suction mouth, and the pulling portion is against an upper inner surface of the through hole; wherein
   the shell disposes two strip-shaped grooves separately formed on two opposite sides of an inner surface thereof; the cover disposes two holding blocks, which are separately protruding from two opposite sides of a periphery thereof and are separately bent outward; and the two holding blocks are separately received into the two strip-shaped grooves.

* * * * *